United States Patent [19]

Eaton

[11] Patent Number: 4,491,493
[45] Date of Patent: Jan. 1, 1985

[54] COMPOSITE TAPE PREPARATION AND APPLICATION

[76] Inventor: Homer L. Eaton, 652 Neptune Ave., Leucadia, Calif. 92024

[21] Appl. No.: 483,293

[22] Filed: Apr. 8, 1983

[51] Int. Cl.³ .............................................. B44C 31/00
[52] U.S. Cl. ..................................... 156/235; 156/250; 156/259; 156/358; 156/353; 156/361; 156/363; 156/510; 156/522
[58] Field of Search ............... 156/235, 250, 259, 358, 156/353, 361, 363, 510, 521, 522

[56] References Cited

U.S. PATENT DOCUMENTS

| | | | |
|---|---|---|---|
| 3,457,137 | 7/1969 | McCarthy | 161/116 |
| 3,574,040 | 4/1971 | Chitwood et al. | 156/522 |
| 3,765,992 | 10/1973 | Stageberg | 156/521 |
| 3,775,219 | 11/1973 | Karlson et al. | 156/363 |
| 3,783,783 | 1/1974 | Hamisch, Sr. | 101/226 |
| 3,810,805 | 5/1974 | Goldsworthy et al. | 156/361 |
| 3,996,089 | 12/1976 | More et al. | 156/235 |
| 4,133,711 | 1/1979 | August et al. | 156/353 |
| 4,174,237 | 11/1979 | Hemming, Jr. et al. | 156/64 |
| 4,208,238 | 6/1980 | August et al. | 156/510 |
| 4,285,752 | 8/1981 | Higgins | 156/250 |
| 4,292,108 | 9/1981 | Weiss et al. | 156/259 |
| 4,317,695 | 3/1982 | Madhu et al. | 156/353 |
| 4,351,688 | 9/1982 | Weiss et al. | 156/358 |
| 4,369,082 | 1/1983 | Kerwin | 156/358 |

OTHER PUBLICATIONS

Report prepared by General Dynamics for the U.S. Government entitled "Prototype Tape Laying Machine GDTL-1", pp. 3, 47, 55-68, 74, 75, 82, 89, 95, 104 & 107.

*Primary Examiner*—Jay H. Woo
*Assistant Examiner*—Timothy W. Heitbrink
*Attorney, Agent, or Firm*—Gausewitz, Carr, Rothenberg & Edwards

[57] ABSTRACT

High strength composite tape is prepared for laying in side-by-side strips upon a work surface by precutting the strips to a predetermined length and mounting the strips upon a carrier belt in longitudinally spaced relation to one another, so that the pressure foot of the machine applying the tape to a work surface may press to the end of one tape strip without pressing the end of the following tape strip. Improved laying of the tape is achieved by stretching a strip of tape entirely across the area on which the tape is to be laid before pressing any part of the tape against the work surface, and then pressing the tape against the surface while the tape is stretched across and adjacent the work surface. The tape is held and stretched across the work surface on supply and take up reels on opposite sides of the work surface, so that the reels need not move along the tape with the moving pressure foot.

28 Claims, 17 Drawing Figures

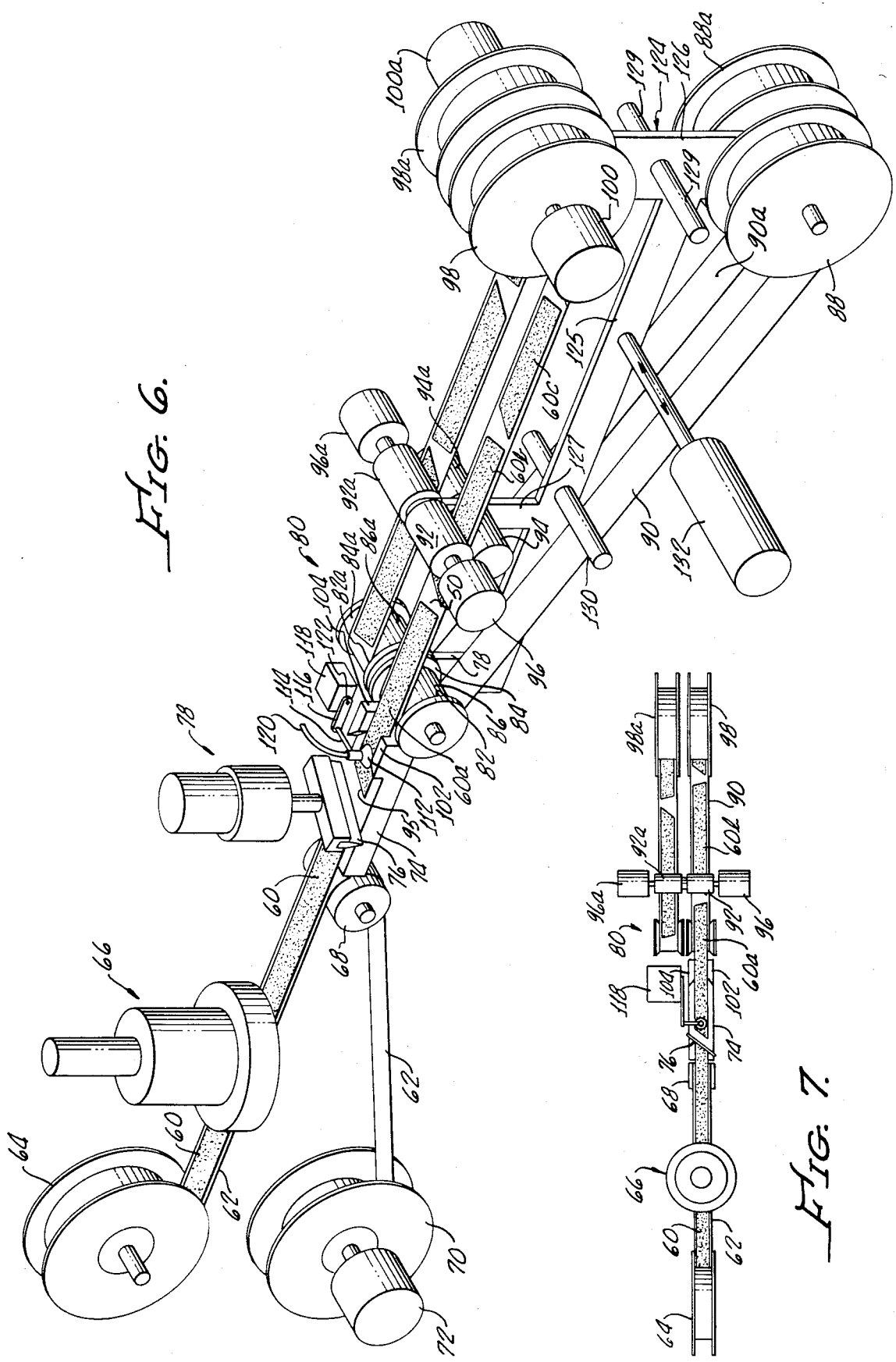

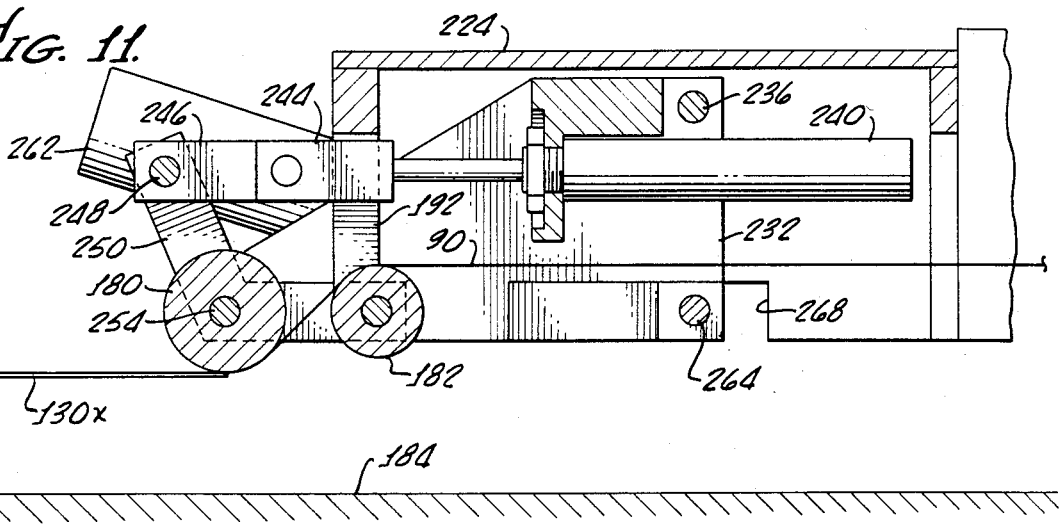
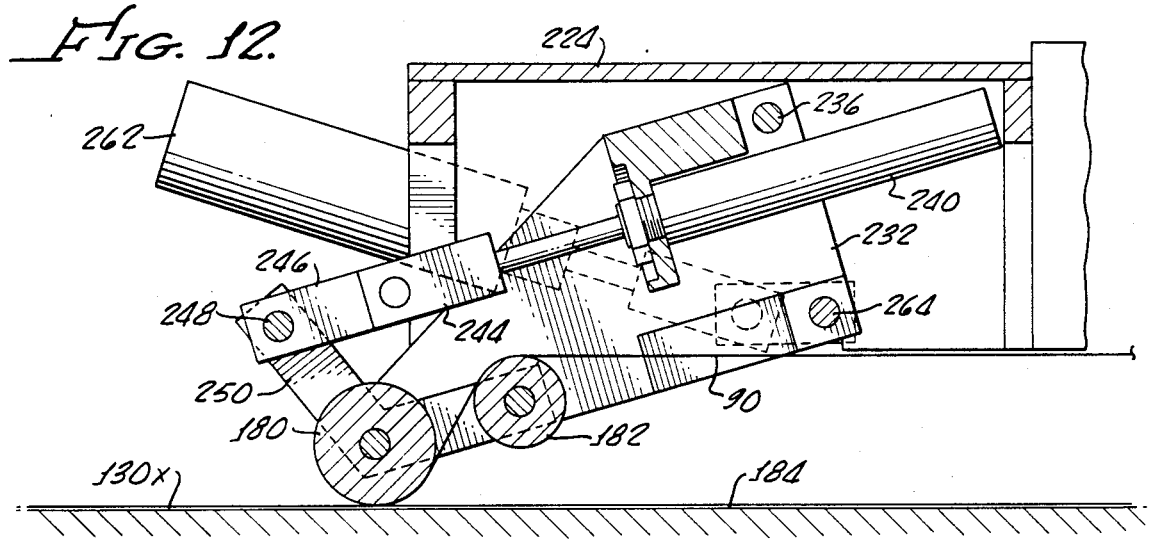
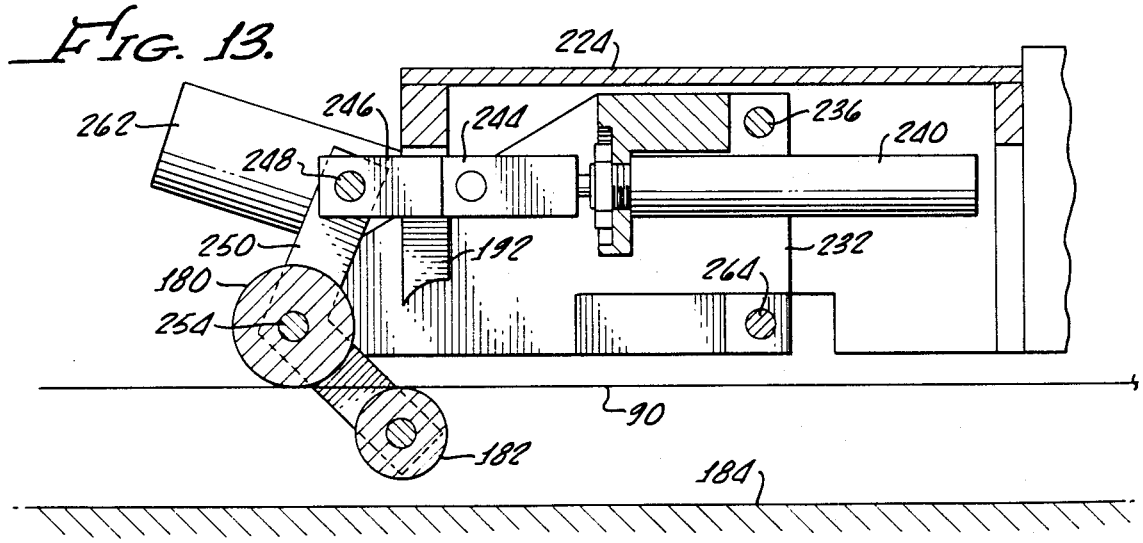

COMPOSITE TAPE PREPARATION AND APPLICATION

The present invention relates to the application of high strength composite tape and more particularly concerns methods and apparatus for laying of composite tape and for its off-line preparation.

BACKGROUND OF THE INVENTION

Composite fiber tape formed of high tensile strength fibers of materials such as boron, graphite, or glass, and impregnated with a matrix of a thermosetting resin, has been employed for a number of years in the manufacture of laminated composite structural shapes for aircraft and aerospace vehicles. Composite tape structural parts are commonly made by superposing many laminations with different tape orientations, each lamination made by laying down strips of composite tape in a side-by-side relation upon a pattern or form. The many laminations are placed in a mold and heated to cure the resin and provide the finished part. Much time, effort, and expense has been devoted to the fabrication of automatic machines for the laying of individual strips of tape. Examples of such tape laying machines are shown in U.S. Pat. Nos. 3,574,040; 3,775,219; 3,810,805; 4,133,711; and 4,292,108.

These machines generally involve an overhead gantry from which is suspended a laterally traveling tape laying head which often carries tape supply and take up reels, guiding mechanisms, cutting mechanisms, a heater, and a tape pressure foot. The tape laying head does all the tape preparation, in addition to pressing the tape upon a work surface. In the head mechanism, tape is withdrawn from a supply reel carried by the mechanism and cut into predetermined strip lengths as it is applied to a work surface. One part of a continuous tape length is often laid down before the trailing end of the tape is cut. The composite tape, having an exceedingly high modulus of elasticity, is stiff, inelastic, and difficult to handle. The tape head laying machine is massive, expensive, slow, and complex, and, in some cases, may comprise a structure in the order of one to two feet in diameter and four to six feet in height. All of this structure must be movably mounted on a gantry and controlled for guiding the tapes in precise, aligned side-by-side paths.

In such prior machines, each cut made in a continuous tape defines both the trailing edge of one tape strip and the immediately adjoining leading edge of the next tape strip. Where the tape is to be cut at an angle, so as to closely follow the angulated boundary of a part that is being formed, the tape pressure foot or roller cannot press to the trailing end of one angularly cut strip without pressing at least part of the immediately adjoining leading edge of the following strip. This is undesirable, because the leading edge of the following strip must be positioned at a different location than the trailing edge of the first strip. Further, for smaller oblique angles of cut, the length of cut increases, and, accordingly, the force required to complete the cut increases, thus further adding to complexity and bulk of the prior art tape laying machine.

An additional problem exists in the laying of tape upon a surface of compound curvature. To properly fit a compound curve, the individual tape fibers must slip longitudinally relative to one another, since those fibers extending over a path of greater curvature must have a greater length than adjoining fibers of the same tape strip that extend over a path of lesser curvature. However, where the tape supply reel is carried by the tape laying machine, and, in particular, where a long strip of tape is not cut until after a portion of the same strip has been laid, no relative slippage of tape fibers is possible.

In prior machines, cutting of the tape, which is generally mounted upon a paper backing ribbon, is achieved either by first removing the paper backing to cut the tape without cutting the ribbon, or by cutting the tape with a carefully controlled cutter that does not sever the backing ribbon. Because in such systems further handling of the tape on the backing ribbon is required, it is necessary either to cut the tape without cutting the ribbon or to replace the tape upon the ribbon after the cutting.

Imperfections in the manufacture of the tape, or damage to the tape during handling, can be discovered in prior art machines only after the tape has been pulled out of the tape laying machine and at least partly laid upon the work surface. Therefore, a damaged tape strip can be replaced only after it has been laid, a situation that increases cost and time of manufacture, particularly where a damaged strip of tape of many feet or many tens of feet in length must be removed after it has been laid.

Accordingly, it is an object of this invention to avoid or minimize above-mentioned problems.

SUMMARY OF THE INVENTION

In carrying out principles of the present invention in accordance with a preferred embodiment thereof, composite tape is preassembled for use in the fabrication of a structural member formed of tape strips laid in side-by-side parallel rows by withdrawing tape from a tape supply station, cutting the tape in consecutive strips, and mounting the consecutive strips of cut tape on a carrier belt in longitudinally spaced relation to one another. An improved method of laying the tape comprises stretching a strip of tape adjacent a work surface between first and second boundaries of a pattern on the work surface, with one end of the strip at one boundary, and pressing one end of the strip against the surface along a pressure area of the tape strip. The pressure area is then moved along the tape strip while holding the strip stretched across and adjacent the work surface area. In a modification of this method, the tape pressure area is moved from an intermediate point of the tape outwardly toward opposite ends of the tape to facilitate laying the tape on a curved surface and to facilitate fiber slippage.

Tape preparation apparatus embodying principles of the invention includes a cutting station having means for feeding tape from a source to the station and carrier belt supply and take up stations with a receiving station therebetween. Means are provided to pass the carrier belt through the receiving station and to feed tape from the cutting station to the receiviing station where the strips of tape are mounted to the carrier belt in longitudinally spaced relation.

Tape laying apparatus embodying principles of the invention comprises an elongated support extending across a work table having supply and take up reel receiving devices mounted at opposite ends of the support. A tape laying pressure head is mounted on the support for motion between the receiving devices adjacent the work table, and includes means for pressing composite tape and its carrier belt against the work table while the head is driven toward the supply receiving device.

According to another feature of the invention, the tape laying head of the apparatus includes a gripping and lifting roller, which may grip the tape while it is being pulled out to position, and which will separate the carrier belt or paper backing from the tape.

BRIEF DESCRIPTION OF THE DRAWINGS

FIG. 6 comprises a pictorial illustration of a tape preparation system embodying principles of the present invention;

FIG. 7 is a plan view of portions of the tape preparation system of FIG. 6;

FIGS. 11, 12 and 13 illustrate three modes of operation of the machine of FIGS. 9 and 10, showing certain details of the tape laying head structure;

DETAILED DESCRIPTION OF THE INVENTION

Figure 1:
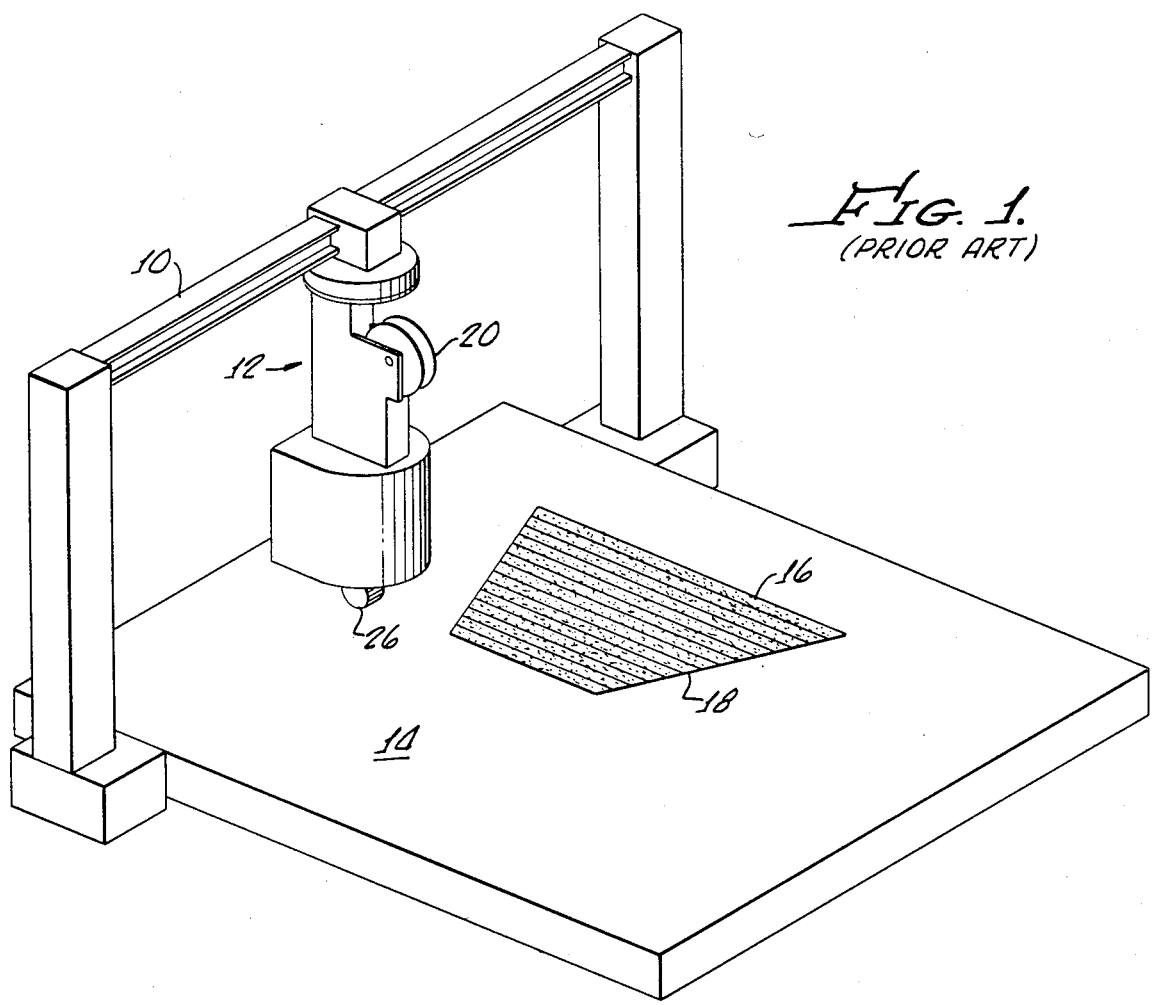
FIGS. 1 and 2 illustrate a prior art integral tape laying head.
Figure 2:
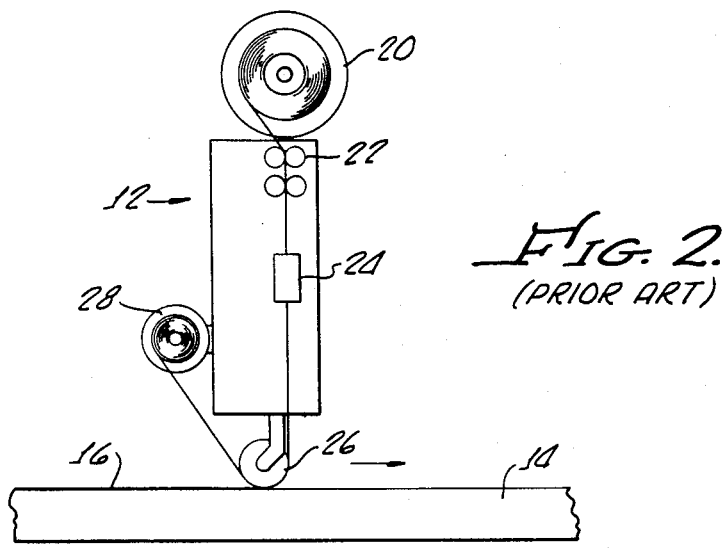
Figure 3:
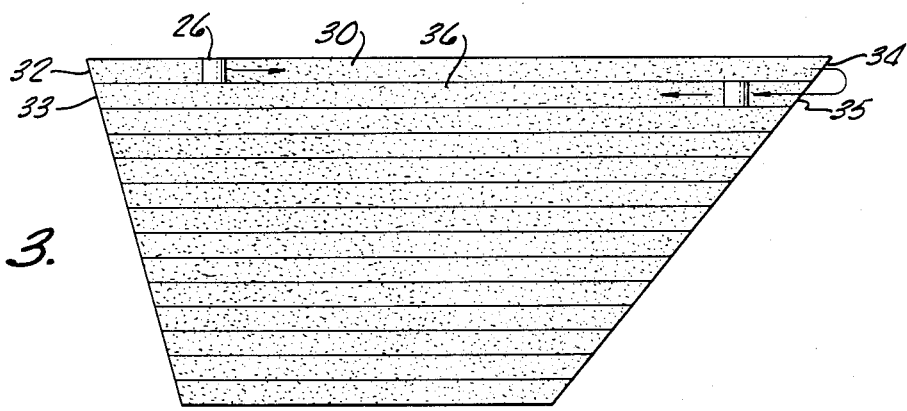
FIG. 3 illustrates a layer of tape strips and a sequence of motions of the integral head of the prior art.

As shown in FIG. 1, an exemplary prior art machine involves a gantry 10, carrying an integral tape head laying machine 12, mounted for travel along the length of the gantry above a table 14 on which is to be laid a layer of tape strips 16 in a pattern, generally indicated as the trapezoidal FIG. 18. The table and gantry are relatively moved along the length of the strips 16 during the laying of each individual strip. To lay successive strips, the integral head 12 is shifted laterally with respect to the table along the gantry 10. As schematically shown in FIG. 2, the integral tape laying head includes a tape supply reel 20, driving rollers 22, a cutting station 24, a tape pressure roller 26, and take up reel 28 for winding up backing paper that is removed from the composite tape. Supply reel 20 stores a roll of composite tape mounted upon a paper backing ribbon. Tape and backing are drawn from the supply reel 20 and passed through and under the pressure roller 26, while the integral tape head is moved relative to the table and relative to the pattern in the direction of the arrows shown in FIGS. 2 and 3. Initially, the tape roller 26 is positioned over the end 32 of a first path 30 and will travel to the far end 34. At some time before reaching the far end 34, the trailing edge of the tape strip being laid on path 30 is cut at the required angle by the integral tape head cutters. Upon reaching the end of path 34, the integral tape head is raised, rotates 180°, and then proceeds in the opposite direction along the adjoining tape laying path 36.

Figure 4:
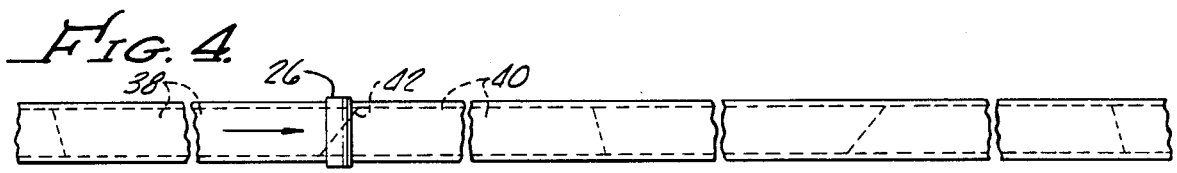
FIG. 4 shows strips of tape cut at angle by an integral head machine.

FIG. 4 illustrates strips of tape 38 and 40 which will be cut and laid by the integral tape head machine shown in FIGS. 1 and 2. The tape strips are shown in dotted lines below the continuous paper backing strip, which is shown in solid lines. With roller 26 moving in the direction of the arrow in FIG. 4, tape strip 38 is laid, being pressed down by the roller traveling to the trailing end 42 of the tape strip. The latter is cut at the indicated angle to conform to the edge of the end 34 of the part pattern illustrated in FIGS. 1 and 3. When the roller reaches the traling end 42 of strip 38, the following tape strip 40, which is still entirely carried in the integral tape head, has its leading edge immediately adjoining the just laid edge of strip 38 so that the roller 26 will necessarily also press against the adjoining edge of the strip 40, producing an overlapping pressure on adjoining ends of consecutive strips. It is undesirable to press the strip 40 down upon the work surface at this time, because the strip 40 must be moved laterally and turned 180° as the tape head turns to begin the next laying course 36. Thus, the tape head will be lifted before it reaches the trailing end of an angularly cut strip, and this unpressed end will be pressed down at a later time.

Figure 5:
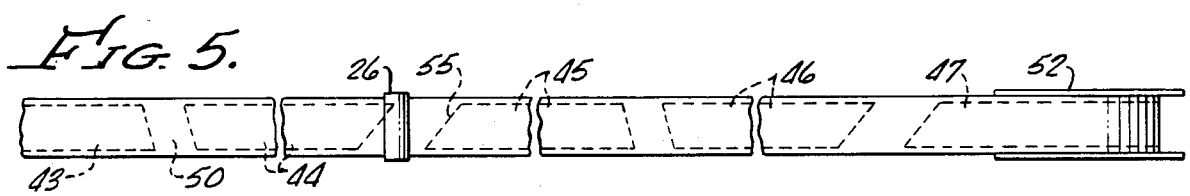
FIG. 5 illustrates a preassembly of tape strips, precut and preassembled on a carrier belt according to principles of the present invention, for use with an integral head machine.

According to certain principles of the present invention, the problem of overlapping pressure on adjoining ends of consecutive cut tape strips is eliminated by preassembly of tape strips. This preassembly also has many other advantages, as will be discussed below. As illustrated in FIG. 5, the several tape strips for each of the successive tape paths (such as paths 30, 36, etc., of FIG. 3) are precut and laid down end-to-end in longitudinally spaced relation upon a carrier belt. The carrier belt, like the paper backing ribbon, may be slightly wider than the composite fiber tape. The assembly of precut tape strips on a carrier belt, when adapted for use with an integral head tape laying machine of the type illustrated in FIGS. 1 and 2, is generally in the configuration illustrated in FIG. 5, wherein precut tape strips 43, 44, 45, 46 and 47 all shown by dotted lines, are laid down upon a continuous carrier belt 50 (shown in solid lines). Both belt and tape strips are wound together and stored upon a composite strip supply reel 52. Adjacent edges of successive strips, such as edges 54, 55 of consecutive strips 44 and 45, are longitudinally spaced from each other by a distance sufficient to enable the roller 26 (or other pressure foot) to run to the very end of strip 44 without overlapping or pressing upon the adjoining end of strip 45.

TAPE PREASSEMBLY

Composing and preassembly of precut tape strips and carrier belt, illustrated in FIG. 5, may be employed for use with a machine of the integral head type illustrated in FIGS. 1 and 2, and may be prepared by an assembly apparatus of the type shown in FIGS. 6 and 7. As shown in these figures, manufactured composite tape 60, mounted on an inexpensive and readily disposable paper backing ribbon 62, is mounted on a supply reel 64 at a supply station, withdrawn from the supply station past an inspection station 66, over a return roller 68, so that the paper backing, after separation from the tape, may be wound upon a take up roller 70 driven by a motor 72. If deemed necessary or desirable, the supply roller 64 may also be driven by a motor (not shown).

Although the supply station is shown in FIG. 6 as comprising a reel of preformed and prewound tape and backing, it will readily be appreciated that the tape manufacturing system itself (which makes and aligns the tape fibers and impregnates them with resin) may form the supply station so that the tape is fed directly from the output of the tape fabrication system past the inspection station. In such an arrangement, the described preparation system will be located at the fabrication system (which is now the supply station), and it may be unnecessary to employ the paper backing 62.

The composite fiber tape 60 is mounted on the upper side of the backing paper ribbon 62 as the tape and ribbon are withdrawn from the supply reel. The resin that impregnates the tape fibers is relatively rigid at the preferred temperature (40° F. or below) of this tape preparation operation. Accordingly, the tape is much stiffer than either its paper backing or the carrier belt. As the paper is bent around the return reel 68, the fiber tape 60 is lifted by its own lack of flexibility from the bending paper backing to which it is but loosely and lightly secured initially, and continues in a straight path to and over the upper surface of a cutting anvil 74. The anvil 74 is part of a tape cutting station having a tape cutter blade 76 carried by a blade driving and rotating mechanism 78, which rotates the blade 76 about a vertical axis to a desired angular position and drives it downwardly against the anvil to cut the interposed tape.

The anvil extends for a short distance past the cutting blade and terminates adjacent the entrance of a receiving station 80 formed, in part, by the beveled flanges 82, 84 of a receiving station roller 86. A carrier belt supply reel 88 has wound upon it a supply of a relatively high quality, reusable, and preferably nondisposable continuous strip of carrier belt 90, which is drawn from the supply and trained over the receiving station roller 86. The belt then passes through a pair of gripping rollers 92, 94 driven by a motor 96, to be wound upon a carrier belt take up reel 98, which is driven by a motor 100. Ahead of the drive or gripping rollers 92, 94 and the receiver roller 86 is provided a pair of upstanding tape guide flanges 102, 104.

Although FIG. 6 illustrates relatively short pieces of cut tape strips 60a, 60b, 60c, it will be readily understood that many, if not the majority of the strips, will be of considerably greater length, depending, of course, upon the size and configuration of the part to be made. In any event, for the assembly of the precut strips and carrier belt of the arrangement illustrated in FIG. 5 (for use with an integral head machine), tape is withdrawn from the supply reel 60, past inspection station 78, and past the cutting station where, at this time, the blade 76 is raised. Paper backing 62 is wound upon the take up reel 66, while the stiffer fiber tape passes unbent along the anvil 74, and over the end of the anvil between lateral guides 102, 104 having beveled entrance edges. From the anvil and guides the tape passes to and between the adjacent outwardly beveled flanges 82, 84 of receiver roller 86 and to be captured between pick up rollers 92, 94. The latter press the tape against the carrier belt 90, which is being driven by motor 100 through the supply station from the supply reel 88 to take up reel 98, while the fiber tape 60 is being driven from the cutting station into the receiving station 80. The tape is withdrawn from supply reel 64 at the same rate that the belt 90 is driven through the receiving station.

When the point at which the tape 60 is to be cut reaches the cutting station, all motion of tape, belt, and all reels and drives is stopped and the cutting blade is activated to cut the tape. Thereafter, the cutter blade is raised and the carrier belt supply and take up systems, together with the pick up rollers, are started to continue to withdraw the now cut trailing end 95 of one tape strip 60a from the cutting station while the supply of tape 60 from supply reel 64 is temporarily and momentarily stopped. After the cut end 95 of tape strip 60a has traveled a distance equal to the desired longitudinal spacing between adjacent tape strips on the carrier belt, take up reel motor 72 is started and tape is again withdrawn from the supply reel 60 in synchronism with the driving of the belt through the receiving station. The drive of all reels and rollers continues until the point of the next cut reaches the cutting station, at which point, all drives are stopped for the cut, the carrier belt drives are again started, and, after a delay, the withdrawal of tape from supply 60 is also started. In this manner, the continuous carrier belt is wound upon the take up reel 98 with precut and longitudinally spaced strips of composite tape pressed upon a surface of the carrier belt. In effect, the carrier belt and tape withdrawal are operated together at the same rate to ensure that long strips of tape will be properly mounted on the belt, but the withdrawal is slowed or stopped momentarily (while belt drives continue) to provide the desired longitudinal spacing of tape strips.

In order to handle small precut strips of tape, a transfer station is interposed between the cutting station and the receiving station. The transfer station includes a vacuum-operated transfer head 112 carried on an arm 114, which, in turn, is mounted to a rotary lever 116 of a support 118 that is arranged to move the vacuum head 112 up and down, toward and away from the tape bearing surfaces, and also to shift the arm and the vacuum head to and from each of the transfer station and the receiving station. To pick up a small piece of tape, after its trailing edge has been cut at the cutting station, lever 116 is operated to move the vacuum head 112 downwardly into contact with the tape on the output end of anvil 74. Vacuum is applied to the head via a vacuum line 120, and lever 116 is rotated about an axis 122 to move the vacuum head and small tape strip upwardly and toward the right (as illustrated in FIG. 6) and then downwardly to position and lightly press the tape down upon the surface of the carrier belt, which will then carry the tape to the pickup rollers 92, 94.

The described arrangement of tape preparation apparatus illustrated in FIG. 6 will prepare a precut assembly of carrier belt and spaced tape strips for use with the bidirectional tape laying integral head of FIGS. 1 and 2. This head may be termed bidirectional, because a first tape strip is laid in the path 30 with the machine moving in a first direction, and the adjoining tape strip is laid in path 36 with the machine moving in the opposite direction relative to the work surface. Such a bidirectional machine may conveniently employ a single cut to separate consecutive strips (where non-right angle cuts are made), because the two cut edges are geometric supplements, and when one is turned through 180°, the supplementary end is now properly oriented. If, however, the tape is to be laid by a machine which lays the tape in only a single direction from one side of a part to another and then returns to the starting side to lay a second strip in the same direction (such a macine will be described below), a pair of successive cuts must be made, one for the leading edge of a first strip and a second cut at a different angle for the adjoining trailing edge of the next strip. For example, and with reference to the pattern of FIG. 3, using such a unidirectional tape laying machine, a first tape strip would be laid down on path 30 starting with a leading end 32 and finishing with a trailing end 34. A strip on the following path 36 would also be laid down in the same direction, starting with its leading end 33 and finishing with its trailing end 35. Before cutting the two tape strips, the leading end 33 of the strip on path 36 will be close to and following the trailing end 34 of the leading strip on path 30. However, ends 34 and 33 are necessarily cut at different angles, and thus two cuts will be required, with an ensuing waste of the costly composite fiber material between the two cut strips.

To enable the use of a unidirectional tape laying process and apparatus while making only a single cut and avoiding the waste between two successive cuts, the tape preparation apparatus of FIG. 6 is arranged to mount a first series of alternate strips cut from tape 60 upon a first carrier belt and to mount the remaining strips cut from the same length of tape 60 upon a second carrier belt.

Accordingly, the described carrier belt composing and preassembly system, including supply and take up reels 88, 98, pick up rollers 92, 94, and the receiving station 80, including the receiving roller 86, are all mounted on one side of a rigid slide plate 124. Slide plate 124 is formed of a horizontal beam 125 having fixed upstanding arms 126, 127, and 128 upon which are respectively mounted reels 88 and 98, rollers 92 and 94, and receiver roller 86. The slide plate is mounted for lateral sliding motion by means of guide rods 129, 130 under control of a bidirectional driving air cylinder 132. Air cylinder 132 and guide rods 129, 130 are fixedly mounted in a support structure (not shown). A second carrier belt composing and preassembly system, including a supply reel 88a, take up reel and drive motor therefor 98a, 100a, receiving roller 186a, pick up rollers 92a and 94a, and pick up motor drive 96a, are all arranged and positioned in the same manner as are the similar components of the first carrier belt composing and preassembly system, but on the opposite side of the slide plate 124. The slide plate is driven laterally between first and second positions by air cylinder 132, so that in its first position the first carrier belt system, including reels 88 and 98 and receiving roller 86, are aligned with the tape 60 coming from supply 64 and the cutting station. In the laterally shifted second position of the two carrier belt composing and preassembly systems, the second system, including supply and take up reels 88a and 90a and associated system components, are all aligned with and will receive the tape 60 coming from the cutting station.

The systems are operated, as previously mentioned, so that alternate cut strips are fed to, and mounted upon, respective ones of the carrier belt composing systems. In other words, a first strip is fed to, and mounted upon, the carrier belt of one system, and then the two side-by-side carrier belt systems are laterally shifted so that the next strip cut and fed from the cutting station is mounted upon the other carrier belt system. The system continues to cut strips and shift belt systems.

A sequence of operations is as follows for this dual carrier belt composing and preassembly system with the system positioned as shown in FIGS. 6 and 7. The graphite or fiber tape is fed from the supply reel 64 past the inspection station, past the cutting station, and into the receiving roller 86 of the first carrier belt system 88, 98, to be wound upon the take up reel 98. During operation of the first carrier belt system, the second carrier belt system, including reels 88a, 98a, its receiving roller, and pick up rollers, are all stopped. The first carrier belt system 88, 98 and the supply and take up reels 64 and 70 are stopped for the cut when an appropriate point on the tape is reached.

After cutting the tape, carrier belt system 88, 98 is restarted to begin to withdraw the cut end 95 of the tape from the cutting blade. After the cut trailing end 95 has traveled a short distance, being pulled from the anvil (and from the still stopped tape 60) by rollers 92, 94 and the driven carrier belt, the take up motor 72 of reel 70 is restarted to again withdraw tape from supply reel 69. When the trailing edge 110 of the first cut strip leaves the cutting station anvil 74, the leading edge of the next strip is spaced rearwardly because of the delay in restarting take up motor 72. Air cylinder 132 is energized at this point to shift the slide plate and all of the components mounted thereon downwardly, as viewed in FIG. 7, so as to displace the first system 88, 98 laterally of the cutting station, and to move the second carrier belt system 88a, 98a and receiving roller 186a into alignment with the cutting station and the tape fed therefrom.

Now, or after a short delay to allow trailing edge 95 to approach rollers 92, 94, the first system 88, 98 is stopped, and when the leading edge of the next strip has passed the end of the anvil and entered the receiving station through a predetermined distance, so as to have attained a predetermined spacing from the trailing edge of any strip that was previously laid upon the belt of the second carrier belt system, the latter is started to drive its carrier belt and pick up rollers. Thus, the tape strip that has just entered the receiving station of the second belt system is driven past the pick up rollers to be wound upon the take up reel 98a. Continued operation of take up reel 70 will drive the leading edge of the tape strip to the pick up rollers 92a, 94a. When the end of the strip being wound upon the system 88a, 98a reaches the cutting station, all systems are stopped, the cut is made, the preassembly or composing system 88a, 98a is restarted, and the supply system 64, 70 is restarted after a suitable delay. When the end of the most recently cut strip leaves the lateral guides at the end of anvil 74, the two preassembly and composing belt systems are laterally shifted back to the first position, the first system 88, 98 is restarted, and the second system 88a, 98a is stopped.

This sequence continues so that a first cut strip is mounted upon the belt of the first system, and the next cut strip is mounted upon the belt of the second system with alternate cut strips being mounted alternately on the first and second belt systems. Thus, with reference to FIG. 8, a strip 130x is cut first and mounted on the first carrier belt 90. The cut is made at a trailing edge 132 of the strip 130x. This same cut forms the leading edge 134 of the following strip 130y which is mounted on the second carrier belt 90a. The trailing edge 136 of the second strip 130y is formed by a cut which also forms the leading edge 138 of the third strip 140x to be mounted on the belt 90. The trailing edge 142 of strip 140x is formed by a cut which also forms the leading edge 144 of a fourth strip 140y which is mounted on the second belt 90a. Accordingly, alternate strips 130x and 140x are all mounted on belt 90, whereas the intermediate alternate strips that are cut between strips 130x and 140x are all mounted on the second belt 90a. In effect, the strips 130x, 140x, etc., on the one belt 90 are all similarly oriented with respect to one another, insofar as their angularly cut ends are concerned. From one point of view, and for the purposes of this discussion, they may be deemed to be of the same "handedness". Likewise, strips 130y and 140y, and similar strips, all mounted on the other belt 90a have their angularly cut ends all oriented in the same direction (assuming substantially linear edges of a part being laid), and all may be considered, for the purposes of this discussion, to be of the same handedness, which is opposite that of the strips 130x, 140x, etc., on the belt 90.

With these arrangements of the preassembled and precut strips on the two belts, each reel 98 and 98a may be employed as a supply reel for laying strips for the same part in a unidirectional laying machine. The assembly on reel 98 may be used to lay parts in a first direction, whereas the assembly of reel 98a may be used to lay strips for the same part but in the opposite direction (either from the other side of the part or with the part turned 180°). The use and orientation of these reels will be described in further detail below.

Although the continuous tape has been shown on the upper side of the withdrawn paper ribbon, and is thus wound on reel 64 with the tape inwardly of the ribbon, it is also common to wind the tape outwardly of its paper backing or with backing on both sides of the tape. It is desired to maintain all bends of the tape in the same direction. Thus, if the tape is wound inwardly on supply reel 64, the cut strips will be wound inwardly of carrier belts 90 and 90a on reels 98, 98a. If the tape is wound outwardly on the supply reel, the cut strips will be wound outwardly on reels 98, 98a. If paper backing is placed on both sides of the tape, when wound on supply reel 64, both backings will be removed before cutting. Whether the tape is wound inwardly or outwardly of its backing or carrier belt, it is always withdrawn for laying with the backing or carrier belt between the pressure roller and the fiber tape.

FIG. 6 shows the use of two tape strip composing systems to enable alternate cut strips to be all properly oriented for use in a single direction tape laying machine. To lay all cut strips in like orientation on a single carrier belt, thus eliminating one of the two composing systems, all of the composing systems ahead of (to the left of, as viewed in FIGS. 6 and 7) the cutting station, including supply reel 64, roller 68, take up reel 70, and inspection station 66, may be mounted for 180° rotation in unison about an axis extending longitudinally of, and lying in the plane of, the tape 60. The rotatable components are then rotated through 180° each time that a trailing edge of a cut strip leaves the cutting anvil. If necessary, the tape 60 may be withdrawn a short distance after each cut to facilitate the tape rotation without interference with the anvil.

TAPE PULLING AND LAYING APPARATUS

Illustrated in FIGS. 9 through 15 is a unidirectional tape apparatus which embodies supply and take up reels that are fixed relative to a given tape strip path and a shuttle-type tape head which reciprocates back and forth between the reels across a work surface. The apparatus can use conventionally prepared composite tape, but is best adapted for use with composed and preassembled tape strips as shown in FIG. 8.

A rotatable work table 150 is mounted on a fixed based 152 beneath a traveling gantry 154, the ends of which are slidably mounted in transverse tracks 156, 158 at opposite sides of table 150. The gantry is driven laterally of the table 150 and along the length of tracks 156, 158 by a motor 160 driving an endless chain 162 via a gear box and sprocket 164, the endless chain being connected at its opposite ends to opposite sides of the end of the gantry 154. A similar motor and chain drive 161, 163, 165 for the other end of the gantry is provided and synchronized with the drive of the first end.

Figure 8:
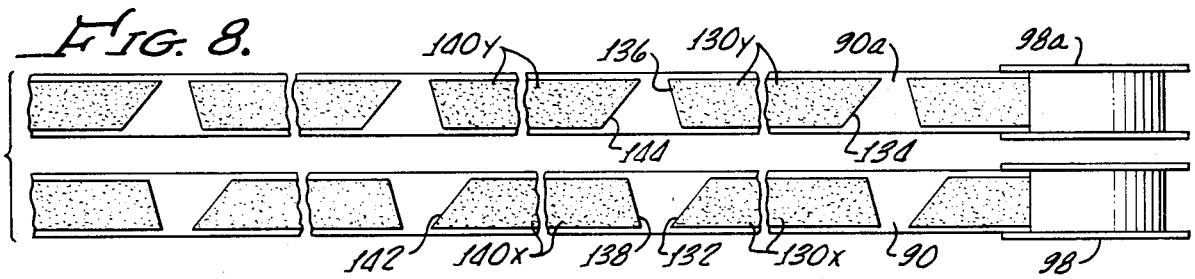
FIG. 8 illustrates two preassemblies of carrier belts and precut tape strips produced by the system of FIGS. 6 and 7.

Mounted at one end of the gantry is a supply reel 166 which may include a composed preassembly of carrier belt and precut, longitudinally spaced tape strips, such as reel 98 or 98a, illustrated in FIG. 8. The tape and belt are wound with the tape relatively inwardly and the belt relatively outwardly, so that the winding of the belt helps to maintain the much stiffer tape in its wound condition. Tape from supply reel 166 is drawn off over a low mass, light-weight, curved tensioning spring 168 and fed through a cutting station 170, which may be employed if precut tape strips are not used for supply reel 166. The tape cutter is preferably arranged to precisely limit blade travel so as to cut through the tape but not its backing. A disposable backing of a conventionally prepared continuous and uncut tape requires use of such a cutter, whereas the above described composed and preassembled tape and carrier belt needs no cutter on the tape laying apparatus. When withdrawn, the tape faces downwardly, being positioned between the belt and the work surface. The wound tape or, more specifically, the carrier belt upon which the tape is wound, is passed through a shuttle type tape laying head 172 which is slidably mounted for reciprocation along the length of gantry 154, and thence past a clamp 174 at the other end of the gantry. From the clamp, the carrier belt extends around a second low mass, light-weight, curved tensioning spring 176 to be wound upon a take up reel 178 mounted at the other end of the gantry. The supply and take up reels are driven by bidirectional drive motors 167, 179, respectively.

Tape head 172, more particularly illustrated in FIGS. 11–15, carries movably mounted and driven pressure roller 180 and belt lifting roller 182. These rollers are driven to three different positions (FIGS. 11, 12, and 13) for operation of the tape head in three different modes. In each mode the belt 90 and the tape strip 130x, for example, pass through the tape head, below the pressure roller 180, and above the lifting roller 182. In pass mode, illustrated in FIG. 13, the pressure roller is raised to a distance above the surface 184 of worktable 150. Lifting roller 182 is also raised, but is considerably below the pressure roller so that the tape and belt, or more specifically, the belt alone, can be readily passed between the two rollers. The pass mode is used for initially (manually) loading the tape which is first drawn from the supply reel 166, around the tension spring and through the cutting station 170, if any, and then threaded between the two rollers 180, 182, as illustrated in FIG. 13, to be attached to and initially wound upon take up reel 178.

Figure 9:
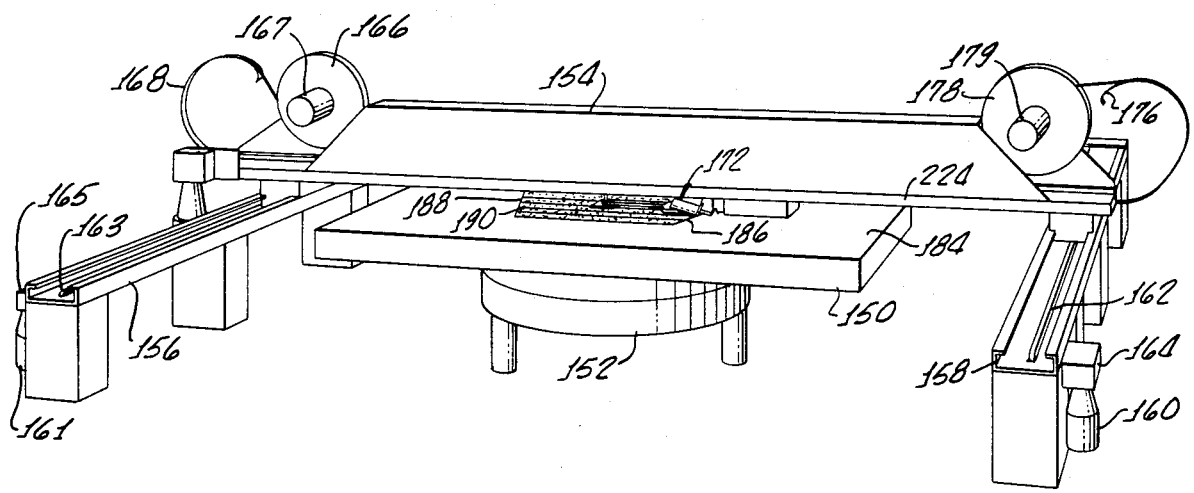
FIG. 9 is a pictorial illustration of a tape pullout and laying machine embodying principles of the present invention.

In the pass mode, the leading section of the belt (which has no tape) is manually pulled between the two rollers until the leading edge of the first tape strip 130X is directly beneath the pressure roller 180. Assume that successive strips of tape are to be laid between boundaries 186 and 188 that define two sides of a pattern 190 upon worktable 150 with the tape to be laid in parallel strips from boundary 186 to 188 (FIG. 9). The head initially is positioned somewhere to the left of the first or lead boundary 186. The head will first pull out and position a first tape strip and then will move from the first boundary 186 along a predetermined path, defined by the gantry position, to the second boundary 188 during the tape laying operation. With the leading edge of the fiber tape strip 130x positioned initially on the carrier belt somewhere to the left of the pattern 190, the tape head is moved in the pass mode until the pressure roller 180 is directly over the leading edge of tape strip 130x, at which time the head is moved into the pull mode (FIG. 11) in which the lifting roller 182 is pivoted upwardly relative to the pressure roller (which remains above the worktable). The lifting roller in pull mode is pressed against a clamp 192 (with belt 90 interposed), and the tape head is moved to the right, while the take up reel is driven to wind up the carrier belt, and the supply reel is driven to unwind the supply of belt and tape.

In pull mode, the tape head is moved to position the leading edge of the cut tape strip directly above the first boundary 186 and the tape head then is driven to its lay mode (FIG. 12) in which the pressure roller 180 is driven downwardly to press against the carrier belt, thereby to press the underlying tape at its leading edge against the surface of the worktable precisely at the first boundary 186. The lifting roller 182 in lay mode is still below the carrier belt, but is above the lowered pressure roller. Thus, the carrier belt is bent relatively sharply about the pressure roller to thereby facilitate the separation of the belt from the relatively stiff and inflexible composite tape as the head moves toward the second boundary 188 in lay mode. Clamp 174 (FIG. 10) at the take up end of the gantry now grasps the carrier belt, and the tape head in lay mode is driven to the left to press the tape against the work surface at a pressure area, which pressure area moves relative to the stationary tape toward second boundary 188 as the tape head moves toward the left, as viewed in the drawings. As the tape head moves toward the second boundary, pressing the tape upon pattern 190 on the work surface, the raised lifting roller continues to lift the carrier belt and separate it from the composite tape. This motion continues until the trailing edge of the composite tape is pressed to the work surface at the second boundary 188. Then the tape laying head is moved to its pull mode (FIG. 11) in which the carrier belt (but not the composite tape) is clamped in the tape head, and both rollers are raised to lift the assembly of carrier belt and leading edge of the next tape strip. The tape head is then moved back toward the first boundary, pulling the belt and tape, and the gantry is shifted laterally to the next tape laying position. Thus, the belt and tape are first pulled out and stretched entirely across the area of the work surface to be covered by the tape, with the opposite ends of the tape positioned at the pattern boundaries. After so stretching and positioning the precut tape strip, the strip is progressively laid upon and pressed against the work surface pattern.

TAPE HEAD STRUCTURE

Opposite ends of an endless driving chain 200 (FIG. 14) are connected to a carriage 202 that carries the tape laying head and rides in tracks in the gantry 154. Chain 200 is driven through a gear box and sprocket 204 (FIG. 10) from a motor 206 in a manner similar to the motor, gear box, and drive for the gantry ends.

In order to ensure precision positioning, direction and steering of the tape as it is being laid, the tape laying carriage carries a vacuum tensioning shoe 208 mounted on an arm 210 carried by the carriage and having a vacuum line 212 connected thereto and leading back to a vacuum source (not shown). It will be noted that the tape and carrier belt are drawn from and to the supply and take up reels (see FIG. 10) at points well above the surface of the worktable so that when the tape is being laid and the pressure roller presses the tape against the table, both the belt, and the combination belt and tape strip, extend from the point of pressure contact of the pressure roller upwardly toward the take up reel and toward the supply reel. The upward inclination of the tape and belt portion between the tape laying head and the supply reel allows the tension head 208 to firmly grasp the belt and tape and to tension the belt and tape between the pressure roller and a point ahead of the pressure roller motion. Because the tension shoe is securely mounted to the tape laying carriage, and the latter is precisely guided by the gantry track, the tension shoe will precisely position the tape to be laid. The tape that is immediately ahead of the pressure roller, that is, the portion of the tape that is just about to be laid, is stretched ahead of the roller in the proper direction and, accordingly, precisely steered along the laying path.

Figure 14:
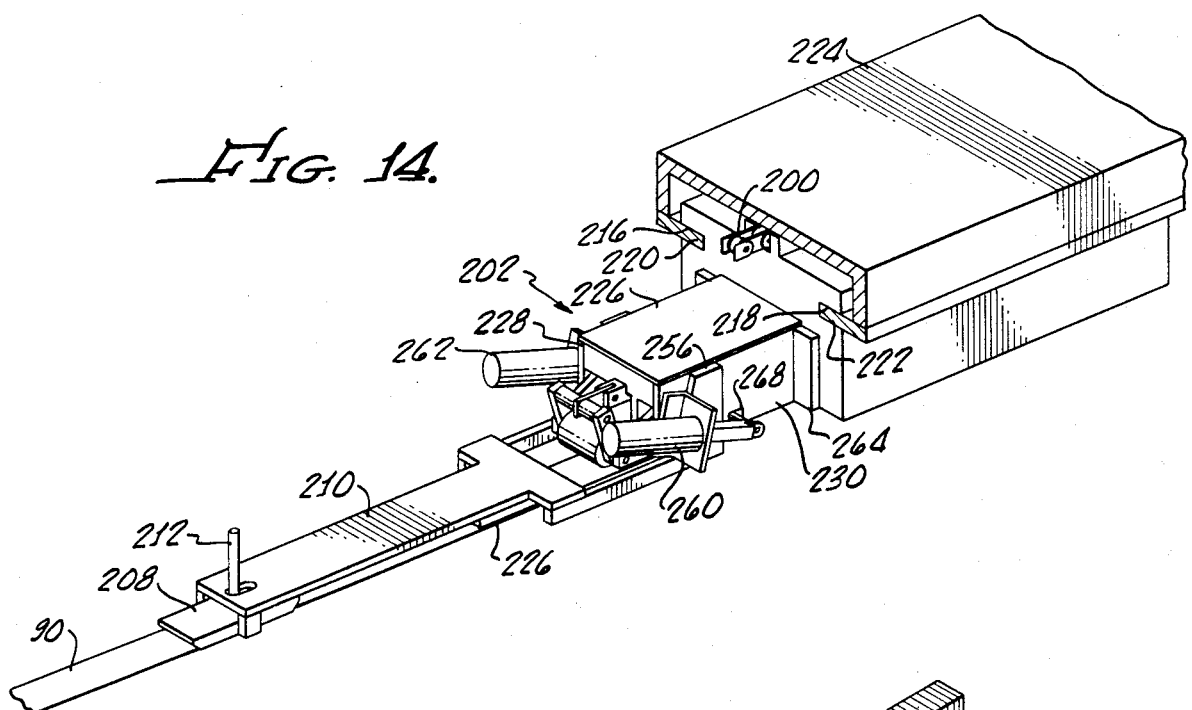
FIGS. 14 and 15 show further details of the tape laying head structure.
Figure 15:
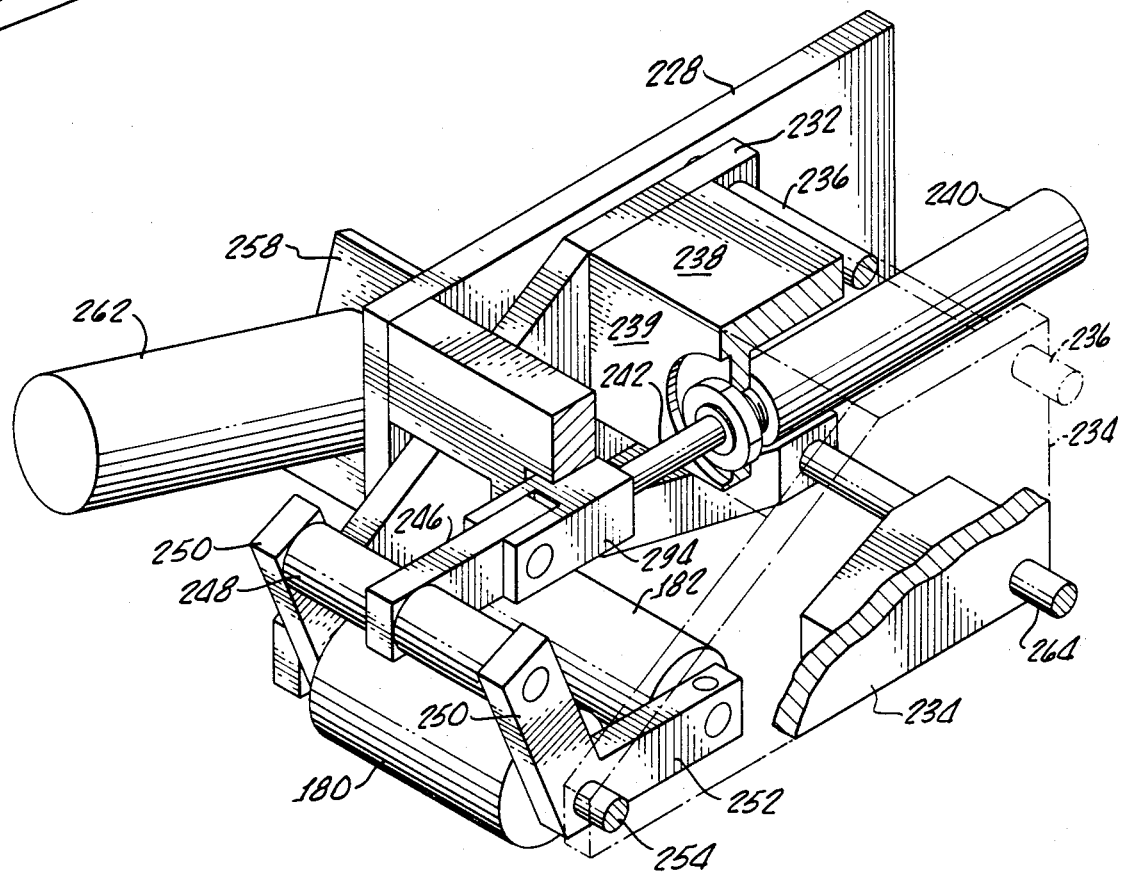

As best seen in FIGS. 14 and 15, the tape head carriage 202 is formed with a pair of laterally disposed longitudinally extending guide slots 216, 218 slideably receiving legs 220, 222 of the generally C-shaped track 224 of the gantry. Endless chain 200 is fixedly connected at one end to one end of the carriage and at its other end to the other end of the carriage. A tape head housing comprising top and side walls 226, 228 and 230 is fixedly mounted to the carriage and rotatably carries a pair of tape laying pressure plates 232, 234 mounted for pivotal motion about a shaft 236 carried by the housing sides 228, 230. Plates 232 and 234 are fixedly interconnected by an L-shaped cross bar 238, having a depending vertical leg 239 that carries an air cylinder 240 having a shaft 242. The cylinder shaft is connected to a yoke 294 that is pinned to an arm 246 which in turn is pivoted to a cross bar 248. Cross bar 248 extends between and is fixed to upper ends of each of a pair of spaced bell crank levers, each including arms 250 and 252.

Lower arms 252 of the bell cranks rotatably mount tape lifting roller 182. The two bell cranks are pivotally mounted on a pivot shaft 254 carried by the pressure plates 232, 234. Shaft 254 also rotatably mounts the pressure roller 180. Side walls 228, 230 carry fixed brackets 256, 258 that fixedly mount pressure roller air cylinders 260, 262 on opposite sides of the tape head. The air cylinder pistons are pivotally connected to a transverse drive rod 264 extending through relatively large apertures 268 in the side walls 228, 230 and mounted in the pressure plates 232, 234.

Accordingly, it will be seen that simultaneous operation of air cylinders 260, 262 will pivot the pressure plates 232, 234, together with all the structure supported thereon (including both rollers 180 and 182) about the pressure plate pivot shaft 236 so as to raise or lower the pressure roller 180, bell cranks 250, 252, and roller 182. Operation of air cylinder 240 will rotate the bell cranks 250, 252 about the pivot axis of shaft 254 to raise or lower the lifting roller 182 relative to the pressure roller 180.

If deemed necessary or desirable, a lateral guide shoe 266 is mounted to the underside of vacuum tension head support arm 210 at a point considerably closer to the pressure roller 180 so as to help steer the tape ahead of the pressure roller and tape head motion.

TAPE LAYING METHODS

Figure 16:
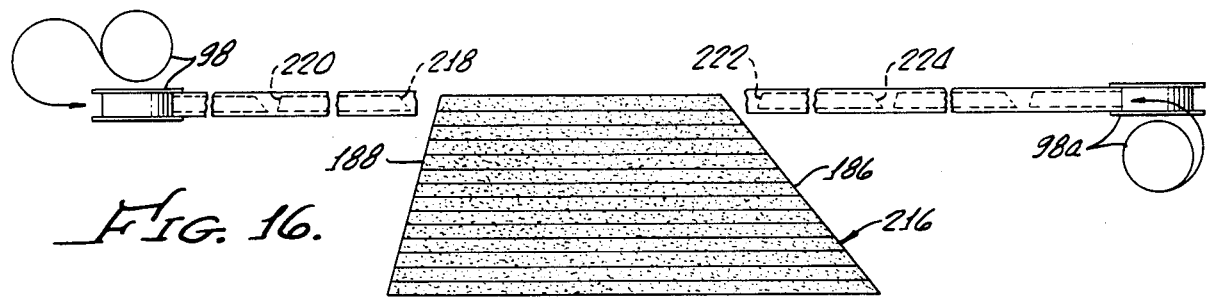
FIG. 16 illustrates the geometry and orientation of preassembled strips of tape and carrier belt for application to an exemplary part.

It will be recalled that the tape preparation apparatus described above provides first and second substantially "opposite hand" assemblies of carrier belt and precut tape strips, such as indicated at reels 98 and 98a of FIG. 8. In the use of the tape pulling and laying apparatus of FIGS. 9-15 for the laying of a part pattern 216 (see FIG. 16), reel 98 is used as supply reel 166 at the left side of the part as shown in FIGS. 9 and 16. When located on the left side of the part pattern 216, the composed and preassembled tape strips and carrier belt on reel 98 are positioned so that the leading edge 218 (leading in withdrawal of tape from the reel) of each precut tape strip will conform to the angular orientation of the first boundary 186, and the trailing edge 220 will conform to the second boundary 188. In laying tape with reel 98, using the pull out and lay down apparatus of FIGS. 9 and 10, the tape is pulled out from left to right and laid down on motion of the tape head from right to left, as viewed in FIG. 16. The tape and belt are withdrawn from supply reel 98 with the tape below the belt, as indicated in FIG. 16.

In order to use the "opposite hand" reel 98a, formed by the tape preparation apparatus, for manufacture of the same part 216, the reel 98a is mounted as a supply reel on the opposite or right-hand side of the tape laying apparatus so that the leading edge 222 of tape withdrawn from reel 98a will conform to the angular orientation of boundary 188 and the trailing edge 224 of the tape strip will conform to the boundary 186. In use of the supply reel on the right side of the part being fabricated, pull out and stretching of the tape across the work surface is from right to left and tape lay down is from left to right. FIG. 16 shows (solely for purposes of exposition) use of both reels 98 and 98a as supply reels for making the same part. Obviously, only one of these reels will be used for any one part.

Figure 17:
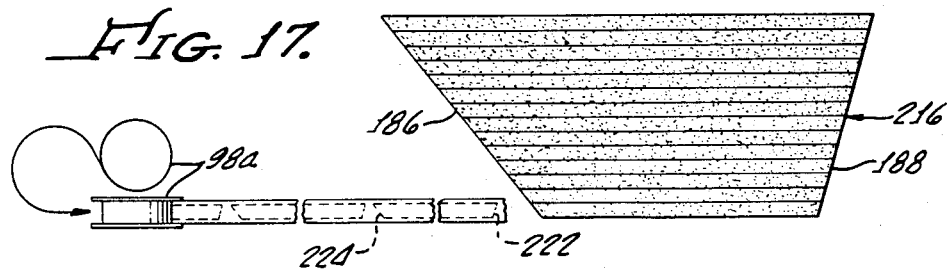
FIG. 17 illustrates another form of the geometry and orientation of application of the preassembled and precut tape strips.

Alternatively, as seen in FIG. 17, the "opposite hand" end reel 98a may also be used on the left-hand side of the machine in the position of supply reel 166 of FIG. 9. Part 216 is rotated 180 degrees about a vertical axis, as by rotation of the worktable 150 upon its support 152. This positions the part 216 with boundary 188 at the right side and boundary 186 at the left side, as viewed in FIG. 17. This arrangement is presently preferred over that shown in FIG. 16 for use of reel 98a.

Figure 10:
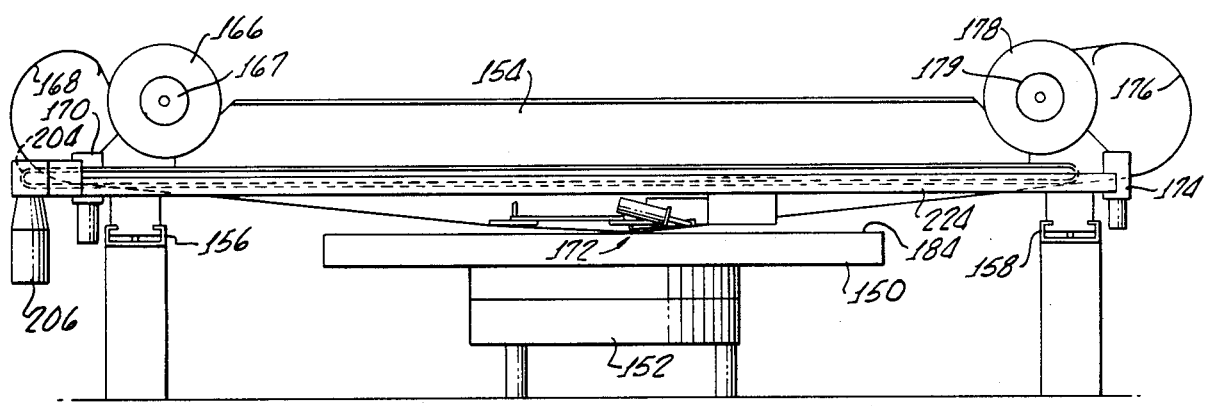
FIG. 10 is an elevational side view of the machine of FIG. 9.

The apparatus of FIGS. 9 and 10 is readily adapted to mount the supply and take up reels interchangeably on either end of the gantry. Clamp 174 is also mountable on either end. Similarly, the tape laying head may be merely remounted at 180 degrees to its illustrated position for laying tape from a supply reel 98a positioned on the right side of the machine.

The described tape laying apparatus, as illustrated in FIGS. 9 through 15, has a number of advantages as compared with prior art integral tape laying heads. The head is considerably smaller, lighter in weight, and easier to maneuver, drive, guide and align. The tape can be inspected before it is laid down, after pulling it out and stretching it across the work area, so as to avoid the laying down of possibly damaged or unacceptable tape which then must be removed. Improved tension control is also provided.

The described tape laying apparatus most advantageously employs a composed preassembly of carrier belt and precut tape strips made by the apparatus and methods described in connection with FIGS. 6 and 7. The preparation arrangement also allows for inspection prior to lay down. A higher quality backing or carrier belt may be used since the belt will be reusable and need not be disposable as in prior systems. Thus, the backing can be provided with improved tape sticking and non-sticking qualities on its opposite surfaces and also can be provided with sprocket holes for easier control and greater precision of registration and positioning. Provision of sprocket holes in the original paper backing tape would excessively add to the cost of this disposable material. Having precut the tape in the preparation system, improved speed of tape lay down is available because there is no need to stop for cutting of the composite tape. On parts having narrow portions, many relatively short length tape strips are required and many stops must be made for the cutting of many small pieces. The disposable backing paper is separated from the fiber tape for cutting in the described preparation system so that there is no need to temporarily remove the backing and replace it, nor is there any need to cut the tape with the paper backing applied with the precision required to avoid cutting of the backing. It is not desired to cut the paper backing since the latter must be used to handle and position the fiber tape.

Another significant advantage of the tape preparation system is that operations of the preparation can be carried out at a considerably lower temperature, such as a temperature of about 40° F. or less, for example, where the resin impregnated tape is considerably easier to handle and easier to cut. Because of its stiffness and to obtain better adhesion to the work surface, the fiber tape must be applied at a higher temperature, on the order of 74°-76° F., for example. However, the impregnating resin is tacky, sticky and harder to handle at the higher temperature, and will more rapidly build up in unacceptable quantities on the cutting blade.

The vacuum tension shoe 208 that is affixed to and ahead of the tape laying carriage, not only ensures proper tension of a portion of the tape ahead of the pressure roller, but in addition, ensures that the tape is positioned close to and at the proper relatively small angle with respect to the work surface. The tension head will maintain this angle of inclination of the portion of the tape ahead of the pressure roller at a fixed value as the tape laying head progresses along its laying path. Because the supply roll is above the work surface, the tape and belt extend at an angle from the supply roll to the point of pressure. This angle will increase as the pressure roller moves toward the supply roll. The provision of the tension roller will avoid this change in angle and, moreover, will hold the tape ahead of the pressure roller at a fixed distance closer to the work surface. The vacuum tension shoe 208 may be caused to apply tension to the belt and tape merely by using the bi-directional drive of the supply reel to tension the entire length of tape after the pressure roller has been dropped to press the tape against the work surface, thereafter causing the tension shoe to grasp the tape and then slightly releasing the tension applied by the supply reel. The low mass, light-weight, curved springs at the supply and take up reels, permit increased speed of operation so that the tape and belt can be started and stopped more rapidly without imposing excessive acceleration and deceleration forces on the tape. The springs will absorb such excessive forces upon sudden starting or stopping of the tape and will help at all times to maintain tension on the tape and belt so as to enable proper positioning as the tape and belt are stretched across the worktable.

The described tape pull out and laying machine can readily be adapted for laying of precut strips of tape on a surface so contoured in two directions so as to require slippage of tape fibers relative to one another particularly if the tape fibers extend longitudinally of the tape, rather than transversely or obliquely) as the tape is laid down. Preferably, for such a contouring operation, the tape is first stretched entirely across the workpiece with its precut ends positioned at opposite boundaries of the path along which the tape is to be laid. Pressure areas, for laying upon compound curvature surfaces, are to be applied from the center of the stretched tape strip outwardly toward opposite ends. Therefore, both tape and belt will be entirely below both rollers of the tape laying head. In fact, lifting roller 182 need not be used at all for laying such a precut tape on a compound curvature contoured surface. After the tape has been positioned and stretched across the pattern, the pressure roller is lowered to press against the belt at the center of the tape strip and then moved toward a first boundary to move the pressure area to one end of the tape. Thereafter, the pressure roller is moved back to the center and the pressure area is then moved from the center toward the other boundary. Moving the pressure roller from the center outwardly toward each end of the precut tape strip significantly enhances the ability of the tape fibers to slip relative to one another. Thus, another advantage of the tape preparation method and apparatus described above is its use for application of tape to a contoured surface as, for example, in laying the tape directly into a mold of compound curvature. The tape filaments, being inelastic, will stretch only a negligible amount and, thus, the pre-cutting of both ends of a tape allows the several filaments to behave relatively independently of one another for longitudinal slippage as the tape strip is pressed downwardly from its center and outwardly in both directions toward both ends. The described tape laying head will accommodate a certain amount of elevation change of the work surface, such as will be encountered in laying tape upon a curved surface. Additional elevation change may be readily handled by connecting the housing 226, 228, 230, and the parts supported thereby, to the carruage 224 for continuous vertical adjustment under control of a suitably programmed motor.

Although the various motors for driving the several parts of the tape laying machine and the tape preparation stations can be operated individually, independently and manually if necessary or desirable, it will be readily appreciated that a suitably programmed digital computer may be employed to send out the appropriate signals in the desired sequence for the operation of the various motors and drives. Conventional types of position sensors, such as shaft position encoders and photoelectric devices may be employed for monitoring and control of position, as well known to those skilled in the art.

The foregoing detailed description is to be clearly understood as given by way of illustration and example only, the spirit and scope of this invention being limited solely by the appended claims.

What is claimed is:

1. The method of laying composite tape between boundaries defining an area of a work surface that is to be covered with a plurality of strips of tape to form a high strength structural part, comprising
    positioning tape supply and take up mechanisms at spaced points along a path that extends between a first boundary and a second boundary,
    stretching a strip of tape between said mechanisms adjacent said work surface with one end of said strip at said first boundary,
    pressing said strip against said surface along a pressure area of said tape strip, and
    moving said pressure area relative to one of said mechanisms along said tape strip and across said work surface area, while holding said tape strip stretched across and adjacent said work surface area.

2. The method of claim 1 wherein the tape is mounted on a carrier belt wound on said supply mechanism, said stretching including stretching both said tape and carrier belt between said first and second boundaries, and including the steps of separating the carrier belt from said tape strip as the tape strip is pressed against said surface.

3. The method of claim 1 wherein said pressing and moving comprises mounting a tape pressing head for motion between said first and second boundaries away from one of said mechanisms toward the other, passing the tape through said tape pressing head, and causing said tape pressing head to press said tape against said work surface and to move toward said second boundary and toward said other mechanism for laying a tape strip upon said work surface.

4. The method of claim 1 wherein said step of stretching comprises mounting composite tape on a carrier belt, stretching a section of the carrier belt across said work surface area and beyond both of said first and second boundaries with said tape on said belt between the work surface and the belt, and separating said belt from said tape as said pressure area is moved.

5. The method of claim 4 wherein said step of stretching comprises gripping an area of said carrier belt extending beyond an edge of said tape, and pulling said belt across said work surface area.

6. The method of claim 4 including the step of tensioning said tape and belt between said moving pressure area and a point ahead of said movement of the pressure area.

7. The method of claim 1 including precutting strips of tape, mounting the cut strips on a carrier belt, winding the belt and cut strips on said supply mechanism, said step of stretching a strip of tape including passing a section of said carrier belt from said supply mechanism to said take up mechanism across said work surface area and across said first and second boundaries adjacent said work surface.

8. The method of claim 7 wherein said pressing of said strip comprises pressing said carrier belt toward said work surface with said tape interposed between the carrier belt and work surface and concomitantly separating said belt from said carrier strip of tape.

9. The method of claim 7 wherein said step of mounting cut strips comprises mounting the cut strips on the carrier belt in longitudinally spaced relation so that an end of one strip is spaced from an adjacent end of an adjoining strip, whereby when said strips are cut at an acute angle to their length said pressure area may be positioned at the end of one strip without extending over part of the adjacent end of the adjoining strip.

10. The method of claim 9 wherein said step of pressing and moving lays a first strip of tape along a first path on said work surface, and including the steps of stretching a second section of the carrier belt across the work surface area and beyond said first and second boundaries to position a second strip of tape on the carrier belt along a path adjacent said first path, and repeating said steps of pressing and moving.

11. The method of claim 1 including the step of grasping and tensioning said tape at a guide area between said pressure area and one of said mechanisms, and moving both said guide area and said pressure area toward said last mentioned mechanism.

12. The method of laying composite tape between boundaries defining an area of a work surface that is to be covered with a plurality of strips of tape to form a high strength structural part, comprising
 winding tape upon a supply mechanism,
 positioning said supply mechanism and a take up mechanism on opposite sides of said area in alignment with a path upon which a strip of tape is to be laid,
 pulling from said supply mechanism a strip of tape precut at both ends to a length equal to the distance along said path between a first boundary and a second boundary,
 stretching said pulled strip across said area between said first and second boundaries,
 positioning a leading edge of said pulled strip at said first boundary, and
 progressively pressing said tape against said work surface at a pressure area that moves along said path relative to one of said mechanisms.

13. The method of claim 12 wherein said tape is mounted on a carrier belt that has a leading portion extending beyond an end of the tape and wherein said steps of pulling and positioning comprise gripping said leading belt portion and pulling said belt with tape thereon until an edge of a precut strip is at said first boundary.

14. The method of claim 12 wherein said pressing step comprises pressing the tape against the work surface from an intermediate area of the tape toward both of its ends.

15. The method of claim 12 wherein said step of pulling comprises mounting a tape pressing head for reciprocation along said path adjacent said work surface and relative to said one mechanism, and causing said head to press an area of said tape against the work surface and to move relative to said one mechanism toward said second boundary for laying tape upon said work surface.

16. The method of laying composite tape between boundaries defining an area of a work surface that is to be covered with side-by-side strips of tape comprising
 cutting a strip of tape at both ends to a predetermined length,
 stretching said strip of tape between a first boundary and a second boundary adjacent said work surface with the cut ends of said strip at said first and second boundaries,
 pressing an intermediate point of said strip against said surface along a pressure area of said tape strip,
 moving said pressure area in a first direction along said tape strip across said work surface area toward said first boundary while holding said tape strip stretched across and adjacent said work surface area,
 pressing an intermediate point of said strip against said surface along a second pressure area of said tape strip, and
 moving said second pressure area in a second direction along said tape strip across said work surface area toward said second boundary.

17. The method of claim 16 wherein said step of stretching comprises mounting composite tape on a carrier belt, stretching a section of the carrier belt across said work surface area and beyond both of said first and second boundaries with said tape on said carrier belt between the work surface and the carrier belt.

18. The method of claim 16 including precutting strips of said tape, mounting said strips upon a carrier belt in longitudinally spaced relation, said step of stretching comprising stretching said carrier belt across said work surface area beyond both of said first and second boundaries.

19. The method of fabricating a high strength multilayer structural part by laying many layers of composite tape between boundaries defining an area of a work surface that is to be covered with strips of tape, each said layer being composed of a plurality of strips of composite tape, said method comprising:
 stretching a strip of tape between first and second mechanisms to extend along a path between a first boundary and a second boundary adjacent said work surface with one end of said strip at said first boundary,
 pressing said strip against said surface along a pressure area of said tape strip,
 moving said pressure area relative to one of said mechanisms along said tape strip and across said work surface area while holding said tape strip stretched across and adjacent said work surface area, and
 laying a number of other strips of tape adjacent said first mentioned strip between said boundaries on said work surface by repeating said steps of stretching, pressing, and moving.

20. The method of claim 19 wherein said strips of tape are layed in a number of superposed laminations, each lamination being formed by laying a plurality of side-by-side strips and orienting the strips of each lamination in the same direction relative to each other and in a different direction relative to the strips of an adjacent lamination.

21. The method of claim 19 including the step of tensioning and guiding said tape strip at a guide area ahead of said pressure area, and moving said guide area along said tape strip as said pressure area is moved.

22. Apparatus for laying composite tape comprising:
 a work table, tape laying support means extending across the table,
 a supply reel receiver mounted at a first part of the support means and adapted to carry a reel of composite tape mounted upon a carrier belt,
 a take up mechanism receiver mounted at a second part of the support means and adapted to receive a carrier belt withdrawn from a supply reel on said supply reel receiver,
 a pressure head mounted on said support means for motion relative to said supply reel receiver across and adjacent said work table, said pressure head including means for receiving and guiding a carrier belt past the pressure head to said take up mechanism receiver, said pressure head including means for pressing said tape against said work table, and means for driving said pressure head relative to said supply reel receiver while pressing said tape against the work table.

23. The apparatus of claim 22 including means on said pressure head for separating said carrier belt from said tape as the pressure head is driven toward said supply reel receiver.

24. The apparatus of claim 23 including means on said pressure head for disabling said pressing means to allow the carrier belt and tape to pass freely through the pressure head, whereby the pressure head can be driven along the carrier belt relative to said supply reel receiver to position the pressure head for gripping and pulling said carrier belt and tape from a supply reel on said supply reel receiver.

25. The apparatus of claim 22 including means on said pressure head for tensioning the carrier belt and tape ahead of said pressing means as the pressure head is driven relative to said supply reel receiver.

26. The apparatus of claim 22 wherein said pressure head includes a head body slidably mounted on said support means, a pressure plate, a pressure foot on said pressure plate, means for moving the pressure plate and pressure foot between a first position in which the foot is adapted to press a tape against a work surface and a second position in which the pressure foot is retracted, a belt gripping member mounted on the pressure plate for movement between a first position in which the belt gripping member passes freely along a carrier belt extending through the pressure head and a second position in which the belt gripping member is shifted relative to the pressure foot to displace a carrier belt passing through the pressure head so as to separate the carrier belt from a tape.

27. The apparatus of claim 26 including a tension arm mounted on said head body and projecting from said head body toward said supply reel receiver, and a tensioning shoe carried on said arm for tensioning a section of the carrier belt and tape ahead of said pressure head as it is driven relative to said supply reel receiver.

28. The apparatus of claim 22 wherein said pressure head includes means for gripping said pressure belt, and including means for driving said pressure head along said support means to pull a section of the carrier belt and tape from a supply reel on said supply reel receiver.

* * * * *

UNITED STATES PATENT AND TRADEMARK OFFICE
CERTIFICATE OF CORRECTION

PATENT NO. : 4,491,493

DATED : January 1, 1985

INVENTOR(S) : HOMER L. EATON

It is certified that error appears in the above-identified patent and that said Letters Patent is hereby corrected as shown below:

In claim 13 (column 17), line 6, after "precut" and before "strip" insert -- tape --.

In claim 28 (column 20), line 2, delete "pressure" and insert -- carrier --.

Signed and Sealed this

Sixth Day of August 1985

[SEAL]

Attest:

DONALD J. QUIGG

Attesting Officer

Acting Commissioner of Patents and Trademarks